(12) United States Patent
Yang

(10) Patent No.: US 8,305,178 B2
(45) Date of Patent: Nov. 6, 2012

(54) ELECTRIC EQUIPMENT IN WHICH HEAT BEING DISSIPATED THROUGH SUPERFICIAL TEMPERATURE MAINTAINING MEMBER AND EXCHANGING FLUID

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 12/909,977

(22) Filed: Oct. 22, 2010

(65) Prior Publication Data

US 2012/0099277 A1  Apr. 26, 2012

(51) Int. Cl.
*H01F 27/10* (2006.01)
*H01F 27/08* (2006.01)

(52) U.S. Cl. .......................... 336/58; 336/57
(58) Field of Classification Search .......... 336/55, 336/57, 58; 310/52, 54, 58, 59, 61
See application file for complete search history.

(56) References Cited

U.S. PATENT DOCUMENTS

| | | | |
|---|---|---|---|
| 1,539,837 A * | 6/1925 | Hayes | 336/58 |
| 1,798,702 A * | 3/1931 | Roebel | 165/104.31 |
| 1,800,163 A * | 4/1931 | Thompson | 165/11.1 |
| 2,440,556 A * | 4/1948 | Paluev | 336/57 |
| 2,711,882 A * | 6/1955 | Narbutovskih | 165/47 |
| 2,947,798 A * | 8/1960 | Camilli et al. | 174/15.1 |
| 3,629,627 A * | 12/1971 | Dafler et al. | 310/44 |
| 3,629,758 A * | 12/1971 | Pearce, Jr. | 336/57 |
| 3,663,910 A * | 5/1972 | Grubb | 336/57 |
| 3,822,389 A * | 7/1974 | Kudlacik | 310/53 |
| 4,124,834 A * | 11/1978 | Walsh | 336/58 |
| 4,276,530 A * | 6/1981 | Benke et al. | 336/58 |
| 4,561,955 A * | 12/1985 | Jackson | 204/228.3 |
| 6,568,287 B2 * | 5/2003 | Golner et al. | 73/863.71 |
| 7,812,699 B2 * | 10/2010 | Moia | 336/55 |
| 7,884,691 B2 * | 2/2011 | Findeisen | 336/57 |
| 8,080,909 B2 * | 12/2011 | Perkins | 310/64 |
| 8,081,054 B2 * | 12/2011 | Guentert et al. | 336/58 |

\* cited by examiner

*Primary Examiner* — Mohamad Musleh
*Assistant Examiner* — Joselito Baisa
(74) *Attorney, Agent, or Firm* — Bacon & Thomas, PLLC

(57) ABSTRACT

The present invention relates to a heat exchange device equipped with a primary fluid circulation loop and a secondary fluid circulation loop and installed between an electrical equipment and a superficial temperature maintaining member, such that the heat generated by the electrical equipment is transmitted by a primary side fluid of the heat exchange device, and a secondary side fluid passes through a heat equalizer installed in the superficial temperature maintaining member so as to dissipate heat through the superficial temperature maintaining member.

5 Claims, 5 Drawing Sheets

ELECTRIC EQUIPMENT IN WHICH HEAT BEING DISSIPATED THROUGH SUPERFICIAL TEMPERATURE MAINTAINING MEMBER AND EXCHANGING FLUID

BACKGROUND OF THE INVENTION (a) Field of the Invention

The present invention relates to a fluid heat exchange device installed at the exterior of an electrical equipment housing, and a primary pipeline of the heat exchange device and the cooling fluid inside the electrical equipment form a primary side fluid circulation loop, and a secondary pipeline of the heat exchange device and a heat equalizer installed in a superficial temperature maintaining member such as superficial ground, lake, pool or river pumping the fluid through the pump form a secondary side circulation loop, by means of the heat equalizer installed in the superficial temperature maintaining member to absorb the heat of the passing fluid with higher temperature so as to dissipate the heat of the electrical equipment.

(b) Description of the Prior Art

A conventional electrical equipment includes a fixed electric transformer or rotary power generator or motor or electric turbine brake device; when an electrical equipment is powered and operated, the heat is generated through copper loss of electric conductive member or iron loss of magnetic conductive member, and the heat is accumulated and temperature is raised with time goes by, so the efficiency and service life of the electrical equipment are affected or the electrical equipment would even be damaged.

SUMMARY OF THE INVENTION

The present invention relates to a heat exchange device equipped with a primary fluid circulation loop and a secondary fluid circulation loop and installed between an electrical equipment and a superficial temperature maintaining member, such that the heat generated by the electrical equipment is transmitted by a primary side fluid of the heat exchange device, and a secondary side fluid passes through a heat equalizer installed in the superficial temperature maintaining member so as to dissipate heat through the superficial temperature maintaining member.

DESCRIPTION OF MAIN COMPONENT SYMBOLS

Figure 1:
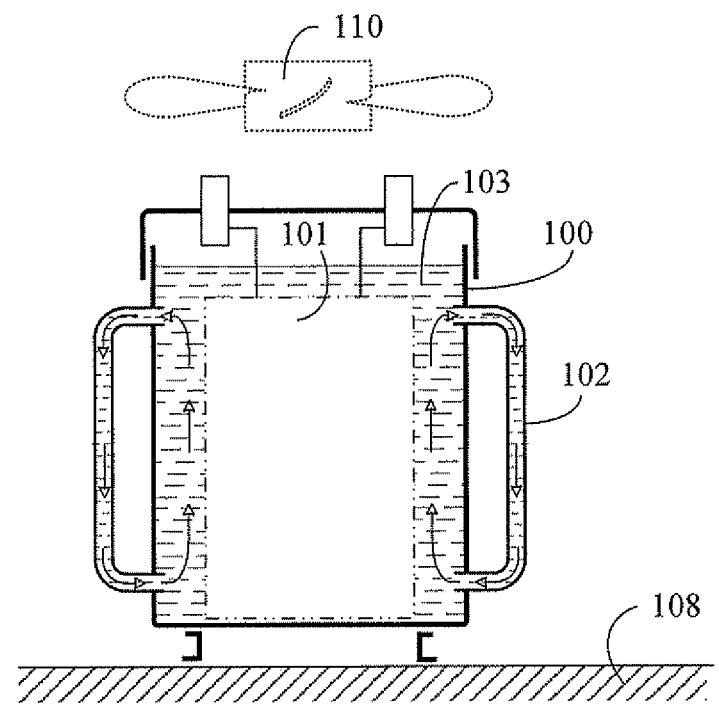
FIG. 1 is a schematic view showing the heat dissipation means of an electric transformer of conventional electrical equipment.

100: housing
101: electric transformer
102, 302, 504: external heat dissipation device
103: insulation cooling fluid
108: natural heat storing member
110: air-cooling fan
111, 311, 411, 511, 611, 711: cooling fluid
201: housing of rotary electrical equipment
202: second-layered housing
203: heat dissipation fin
304: relay heat dissipation device
305, 402, 605, 705: pipeline
306, 406, 506, 606, 607, 706, 707: fluid pump
309, 409, 509, 609, 709: heat dissipation device
404, 603, 703: heat exchange device
601, 701: rotary electrical equipment
602, 702: primary side fluid path
604, 704: second side fluid path

DETAILED DESCRIPTION OF THE PREFERRED EMBODIMENTS

A conventional electrical equipment includes a fixed electric transformer or rotary power generator or motor or electric turbine brake device; when an electrical equipment is powered and operated, the heat is generated through copper loss of electric conductive member or iron loss of magnetic conductive member, and the heat is accumulated and temperature is raised with time goes by, so the efficiency and service life of the electrical equipment are affected or the electrical equipment would even be damaged;

The present invention relates to a fluid heat exchange device installed at the exterior of an electrical equipment housing, and a primary pipeline of the heat exchange device and the cooling fluid inside the electrical equipment form a primary side fluid circulation loop, and a secondary pipeline of the heat exchange device and a heat equalizer installed in a superficial temperature maintaining member such as superficial ground, lake, pool or river pumping the fluid through the pump form a secondary side circulation loop, by means of the heat equalizer installed in the superficial temperature maintaining member to absorb the heat of the passing fluid with higher temperature so as to dissipate the heat of the electrical equipment;

The present invention relates to a heat exchange device equipped with a primary fluid circulation loop and a secondary fluid circulation loop and installed between an electrical equipment and a superficial temperature maintaining member, so that the heat generated by the electrical equipment is transmitted by a primary side fluid of the heat exchange device, and a secondary side fluid passes through a heat equalizer installed in the superficial temperature maintaining member so as to dissipate heat through the superficial temperature maintaining member.

FIG. 1 is a schematic view showing the heat dissipation means of an electric transformer of conventional electrical equipment.

Figure 2:
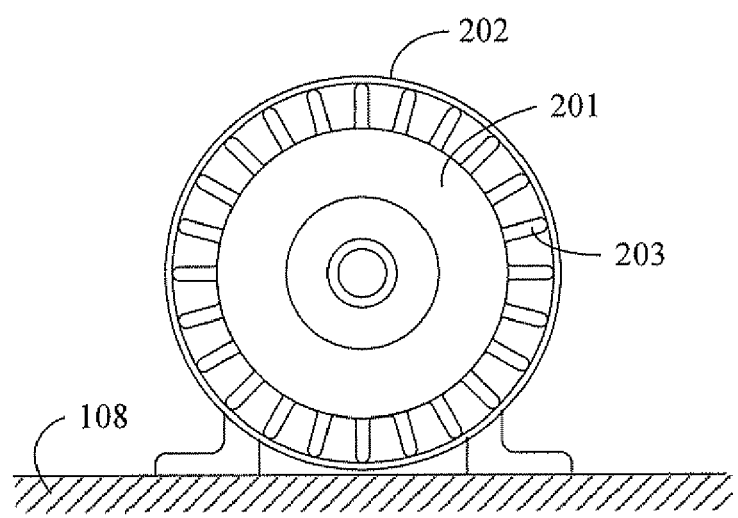
FIG. 2 is a schematic view showing the heat dissipation means of a rotary electrical equipment of conventional electrical equipment.

As shown in FIG. 1, which is a conventional oil-cooled electric transformer, through an external heat dissipation device (102) installed with an top/bottom means and exposed outside the housing of the electric transformer (101), the electric transformer (101) generates heat, and cooling oil (103) is heated to an ascent by heating and descent by cooling state and passes through the external heat dissipation device (102) installed with an top/bottom means and exposed outside the housing of the electric transformer (101), so that the cooling fluid (103) can circularly flow so as to dissipate heat to the exterior; and in the mentioned manner, an air-cooling fan (110) can be optionally installed;

FIG. 2 is a schematic view showing the heat dissipation means of a rotary electrical equipment of conventional electrical equipment.

Figure 3:
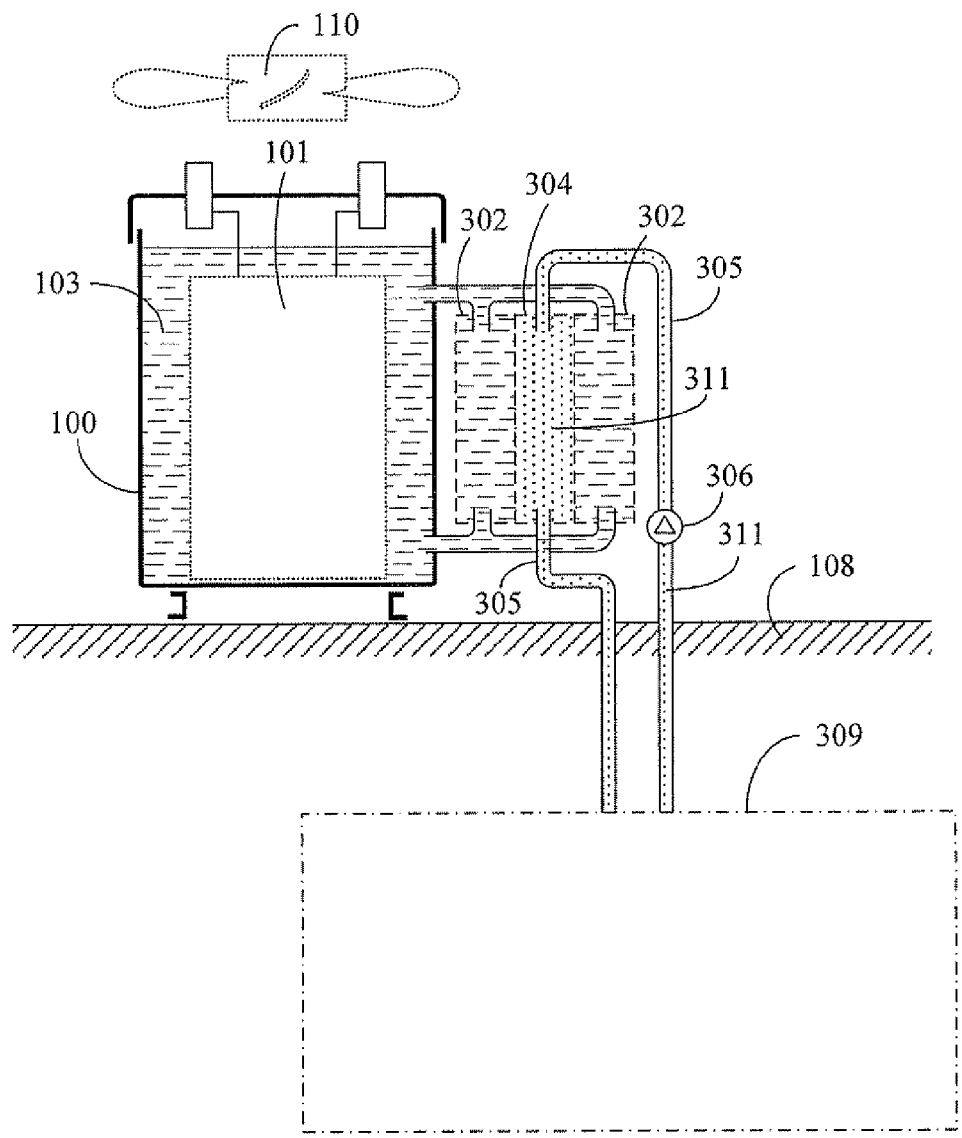
FIG. 3 is a schematic structural view showing the electric transformer installed with the superficial temperature maintaining member and the exchanging fluid according to the present invention.

As shown in FIG. 2, which is a heat dissipation means of a conventional rotary electrical equipment, through installing a second-layered housing (202) on a housing of the rotary electrical equipment (201), the heat dissipation fins (203) are installed between the housing of rotary electrical equipment (201) and the second-layered housing (202);

FIG. 3 is a schematic structural view showing the electric transformer installed with the superficial temperature maintaining member and the exchanging fluid according to the present invention.

Figure 4:
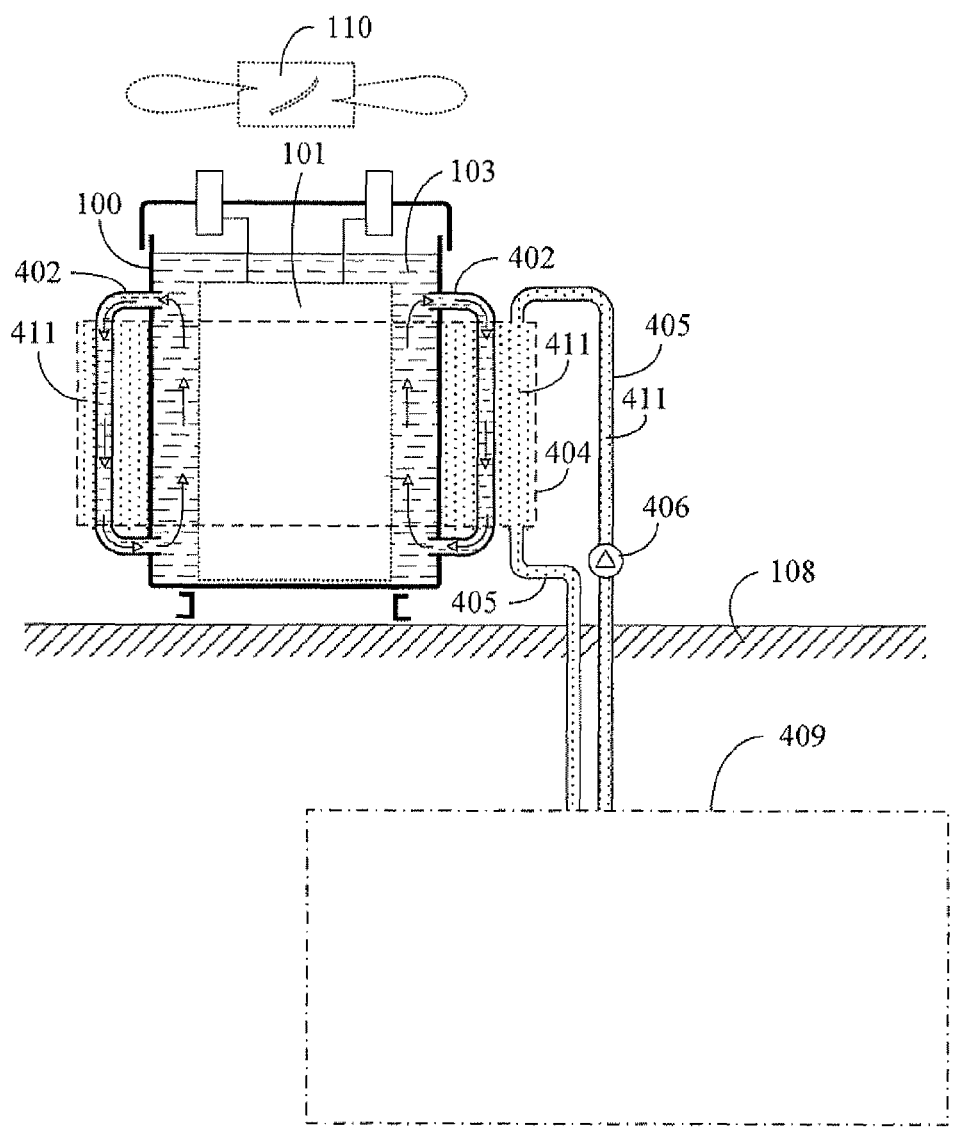
FIG. 4 is a schematic view showing a fluid in the secondary side of a heat exchange device installed on a housing of electric transformer passing through a heat equalizer installed in the superficial temperature maintaining member so as to dissipate heat to the superficial temperature maintaining member.

As shown in FIG. 3, it mainly consists of:
electric transformer (101): which is a voltage transforming device having coil set and iron core, and installed in a housing (100), wherein the housing (100) is provided with an insulation cooling fluid (103) for dissipating the heat generated by the electric transformer (101);
external heat dissipation device (302): which is a container structure allowing fluid to pass through, and installed at the exterior of the electric transformer (101), and the top and bottom thereof circulate and communicate with the insulation cooling fluid (103) in the housing (100) of the electric transformer (101) through fluid pipelines, and combined with a relay heat dissipation device (304) allowing the cooling fluid (311) to pass through for mutually transmitting thermal energy;
relay heat dissipation device (304): which is a container structure allowing fluid to pass through, and combined with the external heat dissipation device (302) for mutually transmitting thermal energy, and through the cooling fluid (311) driven by the pipeline (305) and the fluid pump (306) circularly flowing between the relay heat dissipation device (304) and the heat dissipation device (309) installed in a natural heat storing member (108), so as to allow the thermal energy of the electric transformer (101) be transmitted through the insulation cooling fluid (103) and the external heat dissipation device (302) and the relay heat dissipation device (304) and the cooling fluid (305) to the heat dissipation device (309), thereby the heat dissipation device (309) dissipates the natural heat storing member (308);
heat dissipation device (309): which is a heat dissipation container structure made of a high heat conductive material and allowing the cooling fluid (111) to pass through, and installed in a superficial heat storing member (108) constituted by land, lake or river;
Fluid pump (306): constituted by a fluid pump driven by a mechanical or electric motor;

FIG. 4 is a schematic view showing a fluid in the secondary side of a heat exchange device installed on a housing of electric transformer passing through a heat equalizer installed in the superficial temperature maintaining member so as to dissipate heat to the superficial temperature maintaining member.

Figure 5:
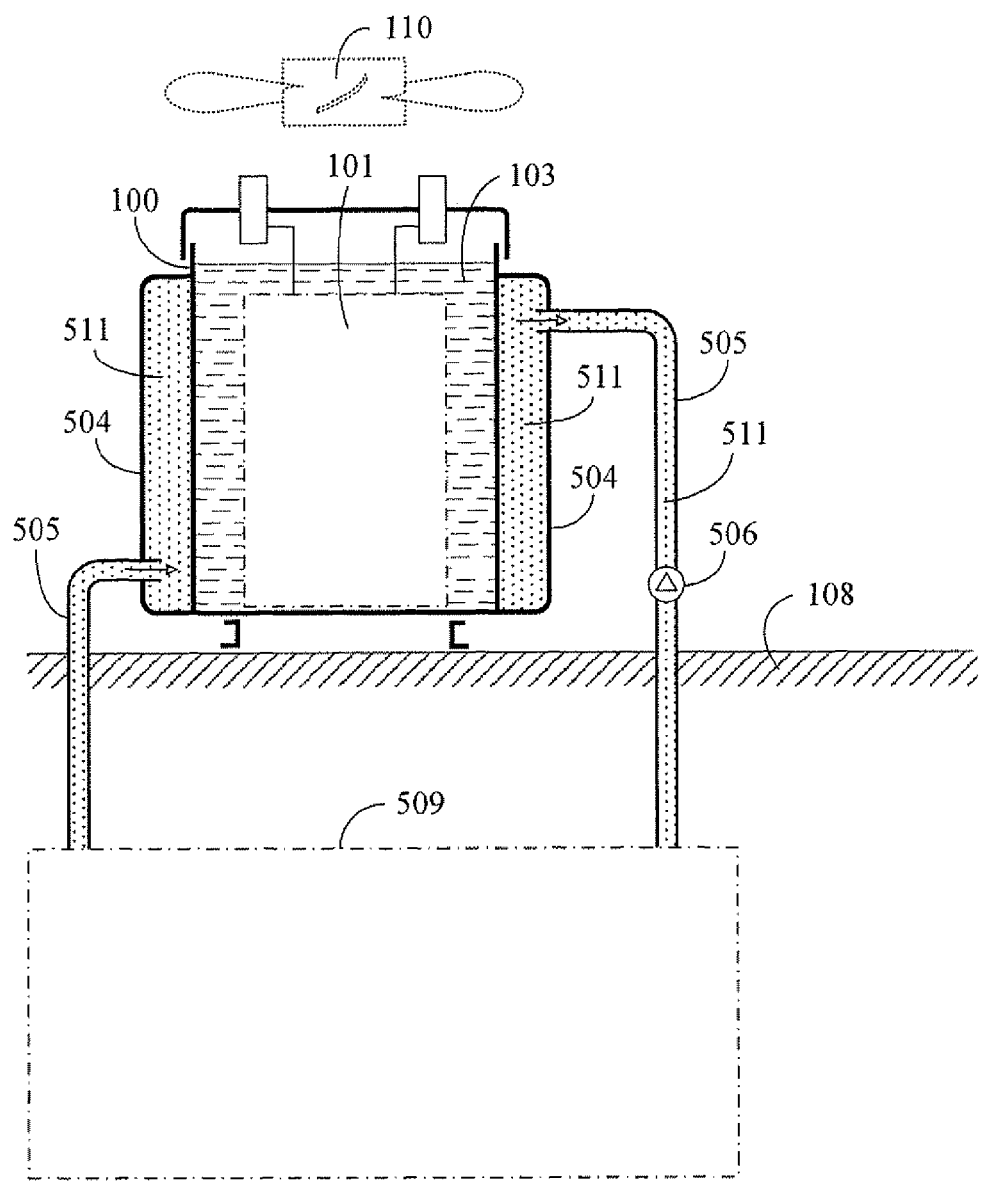
FIG. 5 is a schematic view showing a fluid in the secondary side of a heat exchange device annularly installed in the periphery of a housing of electric transformer passing through a heat equalizer installed in the superficial temperature maintaining member so as to dissipate heat to the superficial temperature maintaining member.

As shown in FIG. 4, it mainly consists of:
electric transformer (101): which is a voltage transforming device having coil set and iron core, and installed in a housing (100), the wherein housing (100) is provided with an insulation cooling fluid (103) for dissipating the heat generated by the electric transformer (101);
heat exchange device (404): which is a container structure allowing fluid to pass through, and installed at the exterior of the electric transformer (101), and the top and bottom thereof circulate and communicate with the insulation cooling fluid (103) in the housing (100) of the electric transformer (101) through fluid pipelines (402), and enables the cooling fluid (411) pumped by the fluid pump (406) to pass through the heat dissipation device (409) installed in the natural heat storing member (108) and thereby form a circulation fluid for transmitting thermal energy;
heat dissipation device (409): which is a heat dissipation container structure made of a high heat conductive material and allowing the cooling fluid (411) to pass through, and installed in a superficial heat storing member (108) constituted by land, lake or river;
Fluid pump (406): constituted by a fluid pump driven by a mechanical or electric motor;

FIG. 5 is a schematic view showing a fluid in the secondary side of a heat exchange device annularly installed in the periphery of a housing of electric transformer passing through a heat equalizer installed in the superficial temperature maintaining member so as to dissipate heat to the superficial temperature maintaining member.

Figure 6:
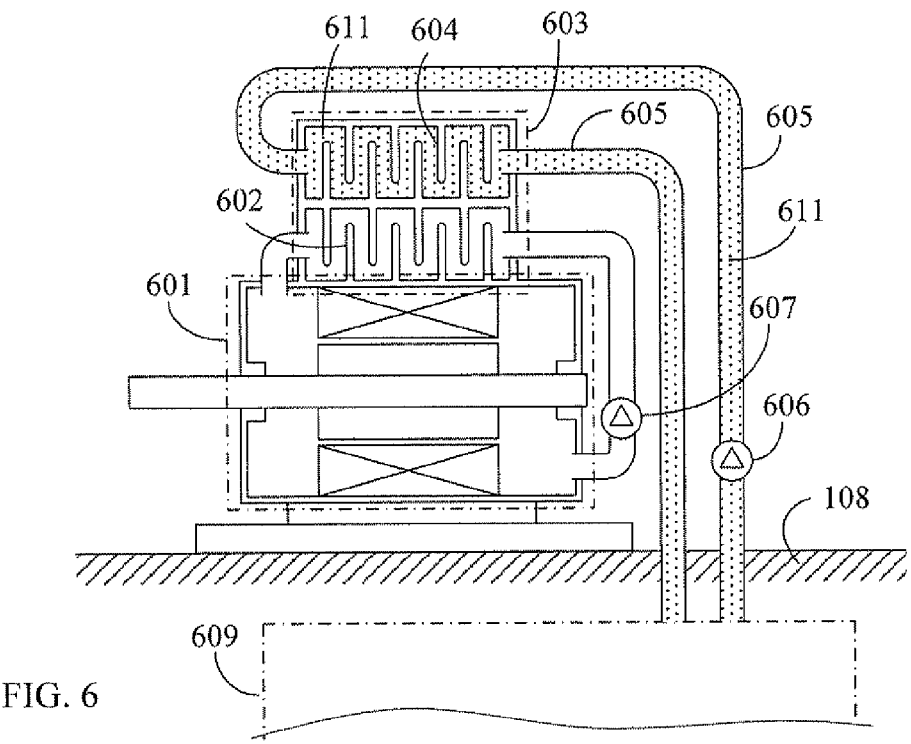
FIG. 6 is a schematic view showing a fluid in the secondary side of a heat exchange device installed on a housing of rotary electrical equipment passing through a heat equalizer installed in the superficial temperature maintaining member so as to dissipate heat to the superficial temperature maintaining member.

As shown in FIG. 5, it mainly consists of:
electric transformer (101): which is a voltage transforming device having coil set and iron core, and installed in a housing (100), the wherein housing (100) is provided with an insulation cooling fluid (103) for dissipating the heat generated by the electric transformer (101);
external heat dissipation device (504): which is a container structure allowing fluid to pass through, and installed to combine with the exterior of the electric transformer (101) for jointly structuring a heat exchange device function, and enables the cooling fluid (511) to pass through the heat dissipation device (509) installed in the natural heat storing member (108) and thereby form a circulation fluid for transmitting thermal energy;
heat dissipation device (509): which is a heat dissipation container structure made of a high heat conductive material and allowing the cooling fluid (511) to pass through, and installed in a superficial heat storing member (108) constituted by land, lake or river;
Fluid pump (506): constituted by a fluid pump driven by a mechanical or electric motor;

FIG. 6 is a schematic view showing a fluid in the secondary side of a heat exchange device installed on a housing of rotary electrical equipment passing through a heat equalizer installed in the superficial temperature maintaining member so as to dissipate heat to the superficial temperature maintaining member.

Figure 7:
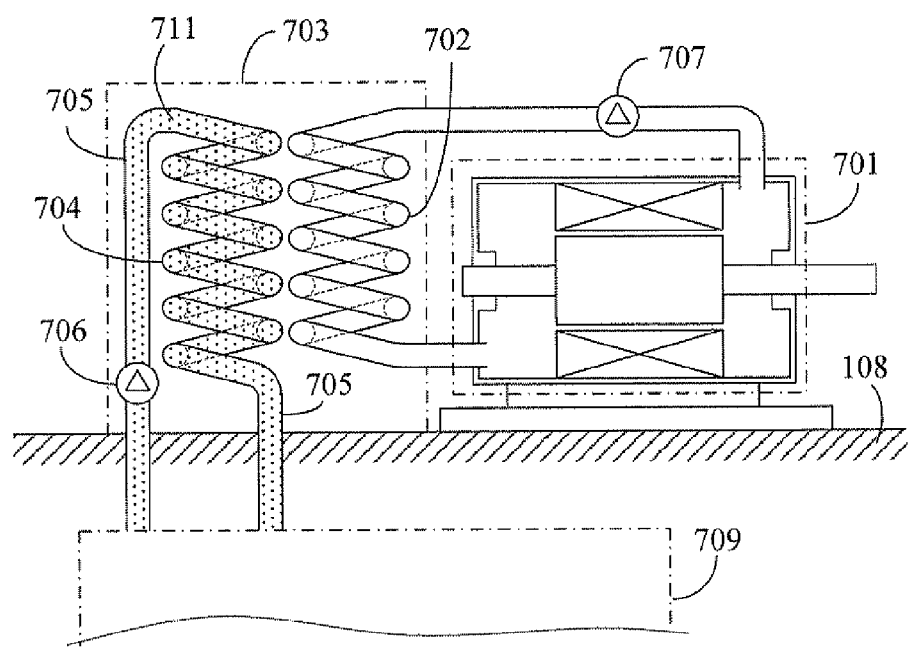
FIG. 7 is a schematic view showing a fluid in the secondary side of a heat exchange device separately installed relative to a housing of the rotary electrical equipment passing through a heat equalizer installed in the superficial temperature maintaining member so as to dissipate heat to the superficial temperature maintaining member.

As shown in FIG. 6, it mainly consists of:

rotary electrical equipment (601): which is a rotary electrical equipment having magnetic field coil set, iron core, rotor and housing, and including to be constituted by the motor, the power generator or the electromagnetic coupling device;

heat exchange device (603): equipped with a primary side fluid path (602) and a secondary side fluid path (604) and capable of mutually transmitting thermal energy, wherein the primary side fluid path (602) is through the pumping by the pipelines and the fluid pump (607) and together with the air flow inside the rotary electrical equipment (601) and thereby form a circulation air flow, while the secondary side fluid path (604) is through the pipelines (605) and the fluid pump (606) to pump the cooling fluid (611) to pass through the heat dissipation device (609) installed in the natural heat storing member (108) and thereby form a circulation fluid for transmitting thermal energy;

heat dissipation device (609): which is a heat dissipation container structure made of a high heat conductive material and allowing the cooling fluid (611) to pass through, and installed in a superficial heat storing member (108) constituted by land, lake or river;

Fluid pump (606, 607): constituted by a fluid pump driven by a mechanical or electric motor;

FIG. 7 is a schematic view showing a fluid in the secondary side of a heat exchange device separately installed relative to a housing of the rotary electrical equipment passing through a heat equalizer installed in the superficial temperature maintaining member so as to dissipate heat to the superficial temperature maintaining member.

As shown in FIG. 7, it mainly consists of:

rotary electrical equipment (701): which is a rotary electrical equipment having magnetic field coil set, iron core, rotor and housing, and including to be constituted by the motor, the power generator or the electromagnetic coupling device;

heat exchange device (703): equipped with a primary side fluid path (702) and a secondary side fluid path (704) and capable of mutually transmitting thermal energy, wherein the primary side fluid path (702) is through the pumping by the pipelines and the fluid pump (707) and together with the air flow inside the rotary electrical equipment (701) and thereby form a circulation air flow, while the secondary side fluid path (704) is through the pipelines (705) and the fluid pump (706) to pump the cooling fluid (711) to pass through the heat dissipation device (709) installed in the natural heat storing member (108) and thereby form a circulation fluid for transmitting thermal energy;

heat dissipation device (709): which is a heat dissipation container structure made of a high heat conductive material and allowing the cooling fluid (711) to pass through, and installed in a superficial heat storing member (108) constituted by land, lake or river; and an air-cooling fan (110) can be further installed;

Fluid pump (706, 707): constituted by a fluid pump driven by a mechanical or electric motor.

In the electrical equipment in which heat being dissipated through superficial temperature maintaining member and exchanging fluid, the heat exchange device being equipped with a route of primary path and a route of secondary path.

In the electrical equipment in which heat being dissipated through superficial temperature maintaining member and exchanging fluid, the embodiment includes to be equipped with a mutually-shared heat exchange device and the mutually-shared heat exchange device is provided with one or more than one routes of primary paths for respectively being provided to the interiors of plural sets of electrical equipments so as to respectively form a primary path, and the mutually-shared heat exchange device is also provided with one or more than one routes of secondary paths for being provided to the same heat equalizer installed in the superficial temperature maintaining member.

In the electrical equipment in which heat being dissipated through superficial temperature maintaining member and exchanging fluid, an air-cooling fan (110) can be further installed.

The invention claimed is:

1. A heat exchange device installed between an electrical equipment and a superficial temperature maintaining member such as superficial ground, lake, pool or river and equipped with a primary fluid loop and a secondary fluid loop, so that the heat generated by the electrical equipment is transmitted by the primary side fluid of the heat exchange device, wherein the heat exchange device is installed at one side of the electric transformer housing and the fluid in the secondary side of the heat exchange device passes through a heat equalizer installed in the superficial temperature maintaining member so as to dissipate heat to the superficial temperature maintaining member, comprising:

electric transformer (101): which is a voltage transforming device having coil set and iron core, and installed in a housing (100), wherein the housing (100) is provided with an insulation cooling fluid (103) for dissipating the heat generated by the electric transformer (101);

heat exchange device (404): which is a container structure allowing cooling fluid (411) to pass through, and installed at the exterior of the housing (100) of electric transformer (101) for jointly providing a heat exchange function, an inside of the container structure containing vertically extending fluid pipelines (402) installed at one side of exterior of the housing (100) of the electric transformer (101), the insulation cooling fluid (103) in the housing (100) of the electric transformer (101) being circulated through fluid pipelines (402) such that the fluid pipelines (402) transmit thermal energy jointly with the housing (100) to cooling fluid (411), and enables the cooling fluid (411) pumped by the fluid pump (406) to pass through the heat dissipation device (409) installed in the natural heat storing member (108) and thereby form a circulation fluid for transmitting thermal energy;

heat dissipation device (409): which is a heat dissipation container structure made of a high heat conductive material and allowing the cooling fluid (411) to pass through, and installed in a superficial heat storing member (108) constituted by land, lake or river;

fluid pump (406): constituted by a fluid pump driven by a mechanical or electric motor.

2. A heat exchange device installed between an electrical equipment and a superficial temperature maintaining member such as superficial ground, lake, pool or river and equipped with a primary fluid loop and a secondary fluid loop, so that the heat generated by the electrical equipment is transmitted by the primary side fluid of the heat exchange device, wherein the heat exchange device is annularly installed at the periphery of the electric transformer housing and the fluid in the secondary side of the heat exchange device passes through a heat equalizer installed in the superficial temperature maintaining member so as to dissipate heat to the superficial temperature maintaining member, comprising:

electric transformer (101): which is a voltage transforming device having coil set and iron core, and installed in a housing (100), wherein the housing (100) is provided with an insulation cooling fluid (103) for dissipating the heat generated by the electric transformer (101);

external heat dissipation device (504): which is a container structure allowing cooling fluid (511) to pass through, and installed to combine with the exterior of the housing (100) of the electric transformer (101) for jointly structuring a heat exchange device function, and enables the cooling fluid (511) to pass through the heat dissipation device (509) installed in the natural heat storing member (108) and thereby form a circulation fluid for transmitting thermal energy;

heat dissipation device (509): which is a heat dissipation container structure made of a high heat conductive material and allowing the cooling fluid (511) to pass through, and installed in a superficial heat storing member (108) constituted by land, lake or river;

fluid pump (506): constituted by a fluid pump driven by a mechanical or electric.

3. A heat exchange device installed between a rotary electrical equipment and a superficial temperature maintaining member such as superficial ground, lake, pool or river and equipped with a primary fluid loop and a secondary fluid loop, so that the heat generated by the rotary electrical equipment is transmitted by the primary side fluid of the heat exchange device, wherein the heat exchange device is installed on top of a housing of the rotary electrical equipment and the fluid in the secondary side of the heat exchange device passes through a heat equalizer installed in the superficial temperature maintaining member so as to dissipate heat to the superficial temperature maintaining member, comprising:

rotary electrical equipment (601): which is a rotary electrical equipment having magnetic field coil set, iron core, rotor and housing, and including to be constituted by the motor, the power generator or the electromagnetic coupling device;

heat exchange device (603): equipped with a primary side fluid path (602) and a secondary side fluid path (604) and capable of mutually transmitting thermal energy, wherein the primary side fluid path (602) is through the pumping by the pipelines that extend from the rotary equipment housing into the heat exchange device (603) installed on top of the rotary electrical equipment (601) and the fluid pump (607) and together with the air flow inside the rotary electrical equipment (601) and thereby form a circulation air flow, while the secondary side fluid path (604) is through the pipelines (605) and the fluid pump (606) to pump the cooling fluid (611) to pass through the heat dissipation device (609) installed in the natural heat storing member (108) and thereby form a circulation fluid for transmitting thermal energy;

heat dissipation device (609): which is a heat dissipation container structure made of a high heat conductive material and allowing the cooling fluid (611) to pass through, and installed in a superficial heat storing member (108) constituted by land, lake or river;

fluid pump (606, 607): constituted by a fluid pump driven by a mechanical or electric motor.

4. The electric equipment in which heat being dissipated through superficial temperature maintaining member and exchanging fluid according to claim 1 or 2 or 3, wherein a mutually-shared heat exchange device is further installed, and the mutually-shared heat exchange device is provided with one or more than one routes of primary paths for respectively being provided to the interiors of plural sets of electrical equipments so as to respectively form a primary path, and the mutually-shared heat exchange device is also provided with one or more than one routes of secondary paths for being provided to the same heat equalizer installed in the superficial temperature maintaining member.

5. The electric equipment in which heat being dissipated through superficial temperature maintaining member and exchanging fluid according to claim 1 or 2 or 3, wherein it is further installed with an air-cooling fan (110).

\* \* \* \* \*